Jan. 29, 1935. L. CLARK 1,989,445
PROCESS OF TREATING HYDROCARBON MATERIALS
Filed March 22, 1933
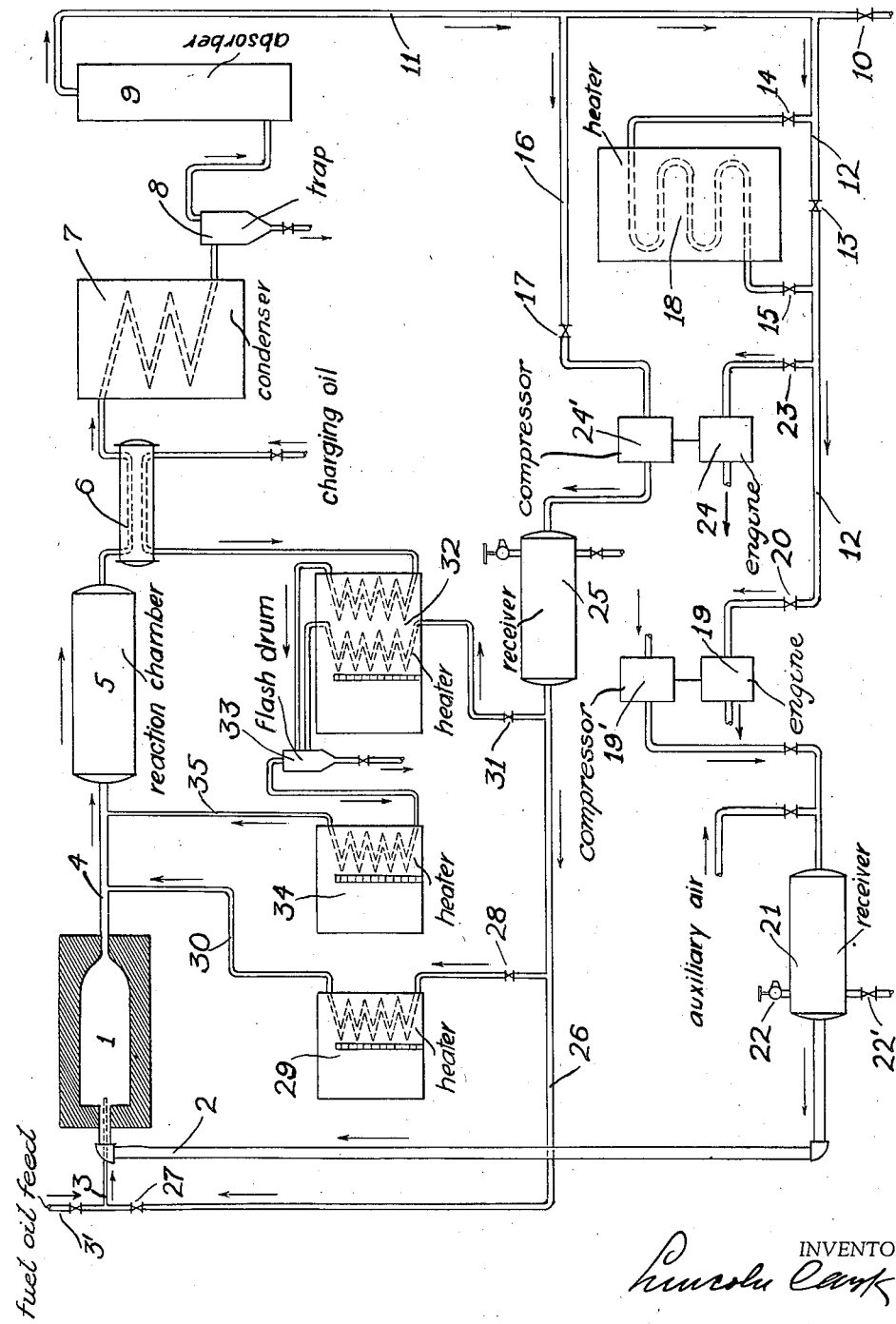
INVENTOR.
Lincoln Clark

UNITED STATES PATENT OFFICE 1,989,445

PROCESS OF TREATING HYDROCARBON MATERIALS

Lincoln Clark, Pasadena, Calif.

Application March 22, 1933, Serial No. 662,105

2 Claims. (Cl. 196—67)

This invention relates to an improvement in the system or operation of treating hydrocarbon materials, particularly by direct contact with heat carrying gases, for the purposes of cracking or reforming said hydrocarbons and more specifically it relates to a means or method of conducting the operation of such treatment at materially lowered operating costs.

In the treatment of petroleum oils or its homologues by direct contact with hot combustion gases for purposes of cracking or reforming, in mode and manner substantially as set out in United States Patent #1,491,518, issued to me April 22, 1924, one of the largest individual operating expenses is the cost of compressing air or oxygen in large volumes for burning fuel under pressure and for generating combustion gases under pressure, whereby also the entire process is carried on continuously under a pressure above atmospheric.

I have discovered that it is possible greatly to reduce these costs by utilizing the potential energy of expansion of the residual or exhaust gases leaving the system under pressure in creating power, as for compressing air or oxygen for use in the combustion of fuel under pressure, or for any other use. Obviously, subsequent to their expansion, these gases may be further utilized, the fixed hydrocarbon gases contained therein as a product of cracking making them suitable for use as a fuel for generating heat or for power purposes.

Since the object of this invention is to generate power from gases for the purposes specified, no particular design of apparatus for utilizing the potential energy of expansion of these exhaust gases is required, as such apparatus may be greatly varied according to need and use. In my work I have used the standard steam pump for moving liquids but an engine similar to a steam engine or turbine would be more satisfactory for air or gas compression or for the generation of electrical power.

By incorporating suitable apparatus as an integral unit or link in the composite system for utilizing the expansive force of gases leaving the cracking system, practically an uninterrupted cycle of steps is obtained in a process which is flexible, efficient and decidedly more economical in operation than where power for operating is obtained from an extraneous source.

I will show a form of apparatus that illustrates how this invention may be carried into practical effect, the illustration being in elevation and diagrammatical.

1 designates a chamber or zone in which gases of combustion ranging in temperature from between 1500° F. to 3700° F. and above are produced under pressure varying from 7½ pounds to 350 pounds or above, the pressure thus produced substantially determining the pressure maintained in the system, the oil or fuel for combustion being introduced through pipe 3 and pipe 3' and the air or oxygen to support combustion being introduced into the chamber through pipe 2. At a suitable point may be interposed whatever instruments, equipment or appurtenances may be required for utilizing the hot gases of combustion in treating materials and subsequently handling the materials so treated. These instruments or pieces of apparatus, as the reaction chamber 5, heat exchanger 6, condenser 7, liquid trap 8 and absorption unit 9, are usual and common in the art and are referred to in order to explain the cracking apparatus. By valve 10 in the conduit or line 11 or by valves 13 and 14 on line 12 or valve 17 in line 16, the pressure of the entire system ahead of these valves may be regulated, so also the flow of gases, of whatever composition they may be after operating reactively upon the treated materials.

The gases to be utilized for power purposes pass through the lines 11 and 12 and valve 20 to an engine 19 in which the potential energy of expansion of the gases is utilized in operating a compressor 19' for compressing air into a receiver 21 having a blow-off cock 22 and a drain cock 22'. The compressed air is conducted through line 2 to the chamber 1 to support combustion of the fuel therein.

These gases, i. e. the gases leaving the cracking system and containing utilizable potential energy, are under pressure, a pressure not greatly reduced from the original pressure exerted in the combustion chamber. It is to be noted that the valve 10 may be unnecessary if the compressor is working under sufficient capacity to maintain the back pressure on the entire system but in case this is not true the valve 10 is essential.

The quantity of potential energy available in the gases for expansion purposes depends upon the pressure and volume of these gases and by raising the temperature of these gases, their potential energy is increased as much as 50 to 100 per cent dependent upon their temperature at the time of entrance into the engine 19. Therefore, prior to the introduction of the gases into the engine 19, they may be heated by routing them through the coil 18, heated in any suitable manner. Flow through the heater is controlled by the valves 13, 14 and 15.

The potential energy of the gases involves only the physical properties of expansion of the gas. Because of this and their content of combustible hydrocarbons, they may subsequently be used as a fuel. In actual practice this gas will be of relatively low heat content, say 170 to 500 B. t. u. per cubic foot.

It is to be understood that there are many methods and hook-ups for the above described process, the illustration being merely exemplary. In a commercial installation these methods and hook-ups will be determined largely by the hydrocarbon being treated and by the cost of power in the particular locality. Due to the many ways of using this power within the process, economical operation may be attained regardless of existing conditions.

Of particular importance in this art is the use of this power within the system in compressing fluids, as air and gases. In the application described above it was used in the compression of air to support combustion in generating combustion gases for treating the hydrocarbons. Another and most desirable application is to compress a portion of these residual gases for reintroduction into the system, either with or without the oil to be cracked. In this case the power content of a portion of the exhaust gases is utilized in compressing a further portion of them to a pressure necessary for their recirculation.

Referring again to the drawing, the portion of the exhaust gases to be expansively utilized for power flows through valve 23 to the engine 24 operating the gas compressor 24'. The portion of exhaust gases to be recirculated enters the compressor 24' through line 16 and valve 17, and the compressed gas passes to the valved receiver 25. From this receiver the gas may be reintroduced into the system in any one of several ways, as desired: it may be used as a fuel in the combustion zone 1 by introducing it thereinto through line 26, valve 27 and burner 3: it may be introduced into the hot combustion gases to cool them or to be cracked itself prior to the introduction of the oil, by passage through line 28, heater 29 which may or may not be actively operated to heat the gases passing through same or to leave the gases in the same condition of temperature at which they enter the heater and line 30: further, it may be used as a substitute for steam in aiding vaporization of the charging oil in a flash drum 33, into which the oil and gas are separately introduced after heating in the heater 32. The gas and vaporized oil leaving the flash drum 33 may be further heated in the superheater 34 and introduced into the stream of hot gases through line 35. As stated above, the particular method of reintroduction of those compressed gases will vary with practice in the art and plant design.

The utilization of this potential physical and combustion energy of the exhaust or residual gases after treating the hydrocarbons is highly essential in the economy of operation of any system or process generating or involving the use of a large volume of gas under pressure and is increasingly essential when these gases are passed through the system and then released to the atmosphere and wasted, as compared to the economy of continual re-use and re-introduction into the system from which they were originally derived.

What I claim is:

1. A process of cracking hydrocarbon material comprising generating hot gases of combustion under pressure above atmospheric in one chamber, in leading the gases from said chamber to a second chamber, in introducing hydrocarbon material into said second chamber for contact with the hot combustion gases whereby a substantial portion of said material is cracked, in removing all of said material from said second chamber and condensing the recoverable hydrocarbons out of the flow, in collecting the combustion gases and gaseous products resulting from the cracking operation, in heating a portion of these gases to increase their expansive energy, in utilizing the expansive energy of these gases to compress another unheated portion of said gases, and in returning the gases thus compressed back into said second chamber.

2. A process of cracking hydrocarbon material comprising generating hot gases of combustion under pressure in one chamber, in leading said gases to a second chamber, in introducing hydrocarbon material into said second chamber for contact with the hot combustion gases whereby said material is cracked, in removing recoverable hydrocarbons and condensing same out of the flow, in collecting the combustion gases and gaseous products formed by the cracking operation, in heating a portion of said gases to increase their expansive energy, in utilizing the expansive energy of a portion of said gases to compress another unheated portion of said gases, in heating the unheated portion of said gases after compression thereof, in returning the gases thus heated back into said second chamber, in utilizing the expansive energy of another portion of said gases to compress air, and in leading the air thus compressed into the combustion chamber.

LINCOLN CLARK.